United States Patent
Mogensen et al.

(10) Patent No.: US 11,341,081 B1
(45) Date of Patent: May 24, 2022

(54) PROPAGATION DELAY COMPENSATION FOR SPI INTERFACES

(71) Applicant: TEXAS INSTRUMENTS INCORPORATED, Dallas, TX (US)

(72) Inventors: Kristen N. Mogensen, Freising (DE); Matthieu Chevrier, Freising (DE); Martin Staebler, Freising (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/197,945

(22) Filed: Mar. 10, 2021

(51) Int. Cl.
  *G06F 13/42* (2006.01)
  *G06F 13/12* (2006.01)
  *G06F 13/374* (2006.01)

(52) U.S. Cl.
  CPC ........ *G06F 13/4291* (2013.01); *G06F 13/122* (2013.01); *G06F 13/374* (2013.01)

(58) Field of Classification Search
  CPC ... G06F 13/122; G06F 13/374; G06F 13/4291
  See application file for complete search history.

(56) References Cited

U.S. PATENT DOCUMENTS

| | | | |
|---|---|---|---|
| 8,928,383 B2 * | 1/2015 | Goswami | G06F 13/4291 327/257 |
| 9,418,037 B2 * | 8/2016 | Bacigalupo | G06F 1/12 |
| 9,582,441 B2 * | 2/2017 | Levy | G06F 1/06 |
| 10,877,673 B2 * | 12/2020 | Marley | G06F 3/0622 |
| 2009/0063736 A1 * | 3/2009 | Wilson | G06F 13/4291 710/61 |
| 2017/0168980 A1 * | 6/2017 | Kilzer | G06F 13/4282 |

* cited by examiner

*Primary Examiner* — Brian T Misiura
(74) *Attorney, Agent, or Firm* — Brian D. Graham; Charles A. Brill; Frank D. Cimino (57) ABSTRACT

A method includes receiving a chip select signal at an SPI client device. The method also includes, responsive to receiving the chip select signal, transmitting a first bit of an SPI transmission to an SPI host device, where the first bit of the SPI transmission is transmitted with a delay based at least in part on a loop propagation delay of an SPI channel. The method includes receiving a clock signal at the SPI client device. The method also includes, responsive to receiving the clock signal, transmitting a second bit of the SPI transmission to the SPI host device.

20 Claims, 5 Drawing Sheets

PROPAGATION DELAY COMPENSATION FOR SPI INTERFACES

BACKGROUND

The Serial Peripheral Interface (SPI) is a synchronous serial communication interface specification used for short-distance communication, including in embedded systems. SPI devices communicate in full duplex mode with one device designated as an SPI host and the remainder designated as SPI client(s). An SPI system uses one SPI host, which communicates with one or more SPI clients. SPI systems use a common clock provided by the SPI host. The SPI host transmits the clock signal and other signals through a data channel to the SPI clients. The SPI clients transmit data to the SPI host through the data channel.

SUMMARY

In accordance with at least one example of the disclosure, a method includes receiving a chip select signal at an SPI client device. The method also includes, responsive to receiving the chip select signal, transmitting a first bit of an SPI transmission to an SPI host device, where the first bit of the SPI transmission is transmitted with a delay based at least in part on a loop propagation delay of an SPI channel. The method includes receiving a clock signal at the SPI client device. The method also includes, responsive to receiving the clock signal, transmitting a second bit of the SPI transmission to the SPI host device.

In accordance with at least one example of the disclosure, a system includes an SPI client device configured to receive a chip select signal. Responsive to receiving the chip select signal, the SPI client device is configured to transmit a first bit of an SPI transmission. The SPI client device is configured to receive a clock signal. Responsive to receiving the clock signal, the SPI client device is configured to transmit a second bit of the SPI transmission.

In accordance with at least one example of the disclosure, a method includes sending a chip select signal from an SPI host device to an SPI client device according to a first clock signal. The method also includes, responsive to receiving the chip select signal at the SPI client device, transmitting a first bit of an SPI transmission from the SPI client device to the SPI host device. The method includes sending the first clock signal from the SPI host device to the SPI client device. The method also includes, responsive to receiving the first clock signal at the SPI client device, transmitting a second bit of the SPI transmission from the SPI client device to the SPI host device. The method includes receiving the first bit and the second bit of the SPI transmission at the SPI host device according to a second clock signal.

BRIEF DESCRIPTION OF THE DRAWINGS

For a detailed description of various examples, reference will now be made to the accompanying drawings in which.

DETAILED DESCRIPTION

SPI uses a common clock signal provided by an SPI host. As the clock signal and other data are transmitted from an SPI host to an SPI client, a propagation delay could occur on the channel between the SPI host and the SPI client. The propagation delay could be caused by buffers, isolators, the physical trace itself, or a number of other causes. If the clock signal and data are delayed when transmitted from the SPI host to the SPI client by the same amount of delay, the delayed arrival of the clock signal and the data at the SPI client generally does not cause an error at the SPI client. However, when the SPI client sends data back to the SPI host, the data received at the SPI host is delayed (due to the propagation delays) when compared to the clock signal provided by the SPI host. This overall delay depends on any propagation delay caused by the channel.

If data from the SPI client is delayed when received at the SPI host, data errors may occur. For example, if data is sampled at the SPI host at a certain edge (rising or falling) of the clock signal, but the data is delayed by more than ½ of a clock cycle, the data may not reach the SPI host and be available for sampling at the appropriate edge of the clock signal. One solution is to reduce the SPI clock frequency so that the SPI propagation delay is less than ½ of a clock cycle. However, this solution increases latency and reduces data throughput. Another solution is to insert an additional propagation delay to synchronize the data from the SPI client with the appropriate clock edge. With this solution, the data transferred from the SPI client is not available at the first clock edge at the SPI host, so the data appears to be right shifted by one bit at the SPI host and the last data bit of the transfer is lost.

In examples herein, the Chip Select (CS) signal transmitted from the SPI host to the SPI client acts as a first clock signal at the SPI client. The CS signal is generally used to enable SPI clients in some applications. Here, a falling edge (or another type of transition) of the CS signal acts as a first clock signal at the SPI client before the SPI host sends any additional data to the SPI client. The SPI client transmits its first bit of data back to the SPI host at the falling edge of the CS signal, instead of waiting for the first clock (SCLK) cycle from the SPI host. Then, as the first cycle of SCLK reaches the SPI client, the SPI client sends subsequent bits after the first bit on the appropriate edge (rising or falling) of SCLK. As an example, the second bit from the SPI client is transmitted at the first cycle of SCLK, the third bit from the SPI client is transmitted at the second cycle of SCLK, etc. In this way, the data transmitted from the SPI client is advanced by one bit. If the total loop delay is one SCLK cycle, the data from the SPI client arrives at the SPI host at the appropriate time. Because the first bit from the SPI client arrives at the SPI host at the first SCLK cycle, this technique compensates for one clock cycle of delay. The examples herein allow the first bit transmitted from the SPI client to the SPI host to be recovered, whereas this bit would be lost in the previous solutions. The solutions herein can be implemented at the SPI client using hardware, software, or a combination of the two.

Figure 1A:
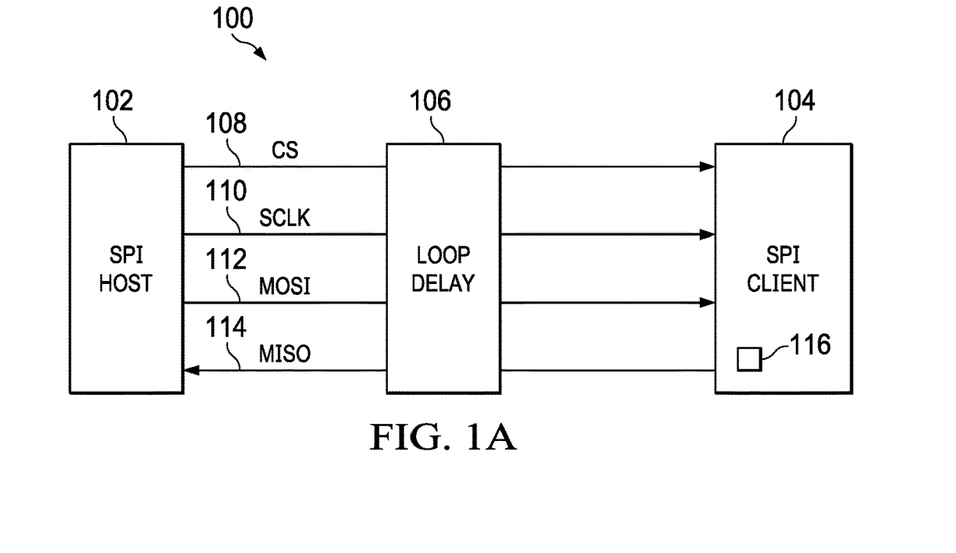
FIG. 1A is a block diagram of an SPI system in accordance with various examples.

FIG. 1A is an SPI system 100 according to various examples herein. SPI system 100 includes an SPI Host 102 and an SPI Client 104. Loop delay 106 represents the total propagation delay on the channel. The propagation delay is the time it takes for a signal to reach its destination. This delay can be caused by hardware in the SPI system, such as the SPI peripheral itself, inverters or buffers in the SPI channel, by the physical trace itself, or a combination thereof. Loop delay 106 represents the total propagation delay for a signal sent from SPI Host 102 to SPI Client 104 and back to SPI Host 102.

The SPI channel is represented by four lines: CS 108, SCLK 110, MOSI (Master Out Slave In) 112, and MISO (Master In Slave Out) 114. In this description, the names of the four lines are used to refer to the signal lines as well as the respective pins connecting to those lines on SPI Host 102 and SPI Client 104. CS 108 is a control line used by SPI Host 102 to select a particular SPI Client 104 to begin communication. CS 108 connects a CS pin on SPI Host 102 to a CS pin on SPI Client 104. CS 108 allows SPI Host 102 to send and receive data or commands to and from a particular SPI Client 104 in a system where multiple SPI Clients 104 are connected to SPI Host 102. In this example, only one SPI Client 104 is shown, but multiple SPI Clients 104 may be present in other examples, hence also multiple CS signals may be used. In an example, CS 108 is an active low logic, and held high (e.g., at a high voltage or a logic level 1), which disconnects SPI Client 104 from the SPI channel. CS 108 could be active high logic in another example. Before data is sent to SPI Client 104 from SPI Host 102, CS 108 is brought low (e.g., at a low voltage or a logic level 0) by SPI Host 102, which activates SPI Client 104. When SPI Host 102 is finished communicating with SPI Client 104, CS 108 is made high again.

SCLK 110 is provided by SPI Host 102. The clock signal is provided to SPI Client 104 (and any other SPI Clients 104) via SCLK 110. The clock frequency in some examples herein can be 10 MHz, 20 MHz, or 40 MHz. As clock frequencies get higher, loop delay 106 presents greater challenges. At a 10 MHz clock frequency, a loop delay 106 of 50 nanoseconds represents ½ of a clock cycle. As noted above, loop delays of ½ clock cycle or longer can lead to data errors. At a 40 MHz clock frequency, a loop delay 106 of 12.5 nanoseconds represents ½ of a clock cycle. Therefore, as the clock frequency increases, smaller loop delays 106 can increase the chance of data errors.

MOSI 112 is the data line used to send data from SPI Host 102 to SPI Client 104. MOSI 112 connects a MOSI pin on SPI Host 102 to a MOSI pin on SPI Client 104. MISO 114 is the data line used to send data from SPI Client 104 to SPI Host 102. MISO 114 connects a MISO pin on SPI Host 102 to a MISO pin on SPI Client 104.

As an example of communication between SPI Host 102 and SPI Client 104, SPI Host 102 selects SPI Client 104 with a logic 0 on CS 108. During each clock cycle, SPI Host 102 can send a bit to SPI Client 104 on MOSI 112, and SPI Client 104 can send a bit to SPI Host 102 on MISO 114. Transmissions can involve two shift registers (one in SPI Host 102 and one in SPI Client 104, not shown in FIG. 1A) of a given word-size, such as eight bits. On the appropriate clock edge (rising or falling), both SPI Host 102 and SPI Client 104 shift out a bit and output it on the appropriate transmission line (MOSI 112 or MISO 114) to the other. On the next clock edge, at both SPI Host 102 and SPI Client 104 the bit is sampled from the transmission line (MOSI 112 or MISO 114) and set as a new least-significant bit of the shift register. After the register bits have been shifted out and in, SPI Host 102 and SPI Client 104 have exchanged register values. If more data is to be exchanged, the shift registers are reloaded and the process repeats. Transmission may continue for any number of clock cycles. When transmission is complete, SPI Host 102 can stop toggling SCLK 110, and can also deselect SPI Client 104 with a logic 1 on CS 108.

In other examples, other size words can be used, such as twelve-bit words or sixteen-bit words. If there are multiple SPI Clients 104 coupled to SPI Host 102, the SPI Clients 104 that are not activated via CS 108 disregard the SCLK 110 and MOSI 112 signals, and do not drive their respective MISO 114 lines.

SPI Client 104 includes delay compensation module 116. Delay compensation module 116 includes the appropriate hardware and/or software to enable SPI Client 104 to compensate for the propagation delay caused by loop delay 106. SPI Client 104 with delay compensation module 116 is backwards compatible with existing SPI systems. In this example solution, SPI Host 102 can be any standard SPI Host 102 without modification. Compensation for loop delay 106 is performed at SPI Client 104 using delay compensation module 116 in this example.

As an example, delay compensation module 116 uses the falling edge (or another transition in another example) of CS 108 received at SPI Client 104 to transmit the first bit to SPI Host 102. SPI Host 102 drives CS 108 low at least one clock cycle before SPI data transfer begins. Then, as SCLK 110 reaches SPI Client 104, SPI Client 104 sends subsequent bits after the first bit on the appropriate edge (rising or falling) of SCLK 110. Delay compensation module 116 also can add a configurable delay so that the overall loop delay 106 is one clock cycle. If the total loop delay 106 is one SCLK 110 cycle, the data from SPI Client 104 arrives at SPI Host 102 at the appropriate time. Also, for a transmission of size N bits from SPI Client 104, delay compensation module 116 can "blank" the last clock signal after N−1 clock cycles, so that only N bits are transmitted to SPI Host 102 instead of N+1 bits. N is the SPI data width (e.g., eight bits, sixteen bits, etc.). N−1 clock cycles are used for a unidirectional transfer, where SPI client 104 transfers data to SPI Host 102. Bidirectional transfers may use a different number of clock cycles in some examples. Examples of delay compensation module 116 are described in the figures below.

Figure 1B:
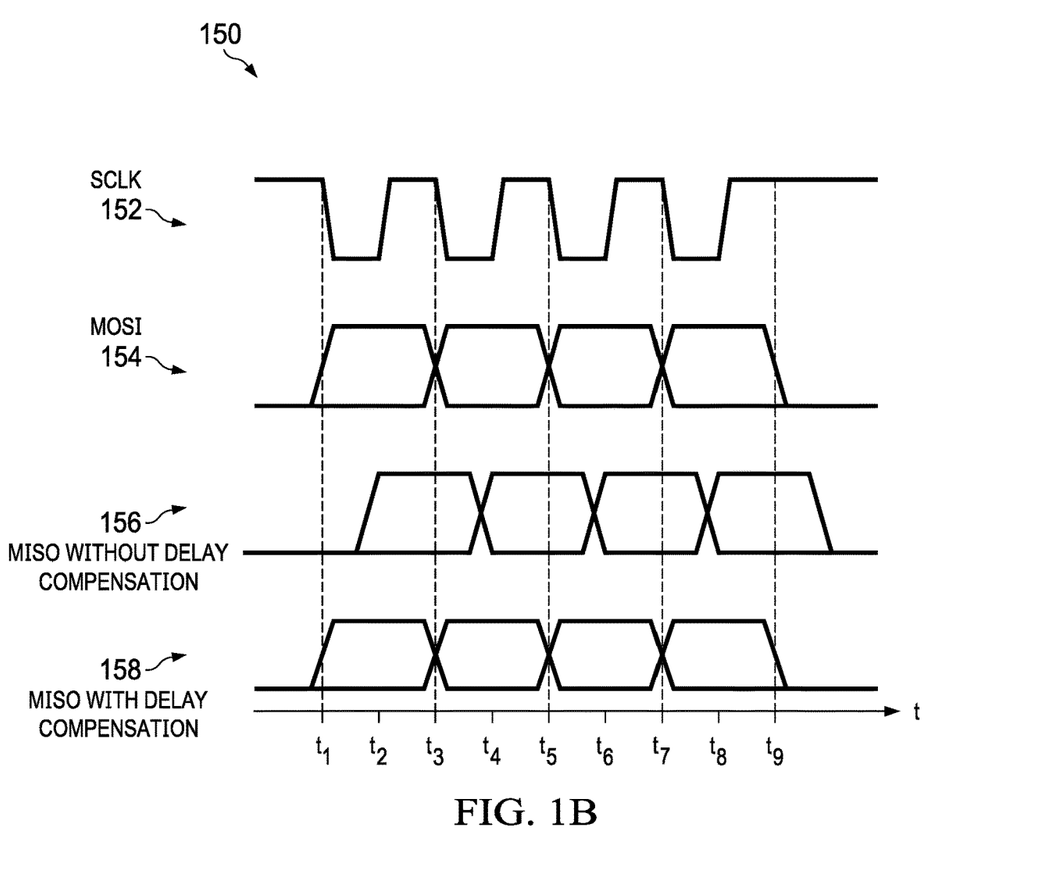
FIG. 1B is a timing diagram of waveforms in an SPI system in accordance with various examples.

FIG. 1B is a collection of waveforms 150 in accordance with various examples. Waveforms 150 are graphed with respect to time t and represent signals at the time they are transmitted or received by the SPI Host 102. Waveform 152 is an example of the clock signal transmitted on SCLK 110. Waveform 152 is a periodic clock waveform provided by SPI Host 102. Waveform 152 oscillates between a high and low state at a predetermined rate, such as 10 MHz or 20 MHz in some examples. Either the rising edge or the falling edge of waveform 152 may be used to sample data. In this example, data is sampled at the rising edge of waveform 152.

Waveform 154 is an example of a MOSI signal transmitted on MOSI 112. Waveform 154 represents the data transmitted from SPI Host 102 to SPI Client 104. In this example, data of waveform 154 is transmitted on the falling edge of waveform 152 (e.g., at times $t_1$, $t_3$, $t_5$, and $t_7$).

Waveform 156 is an example of a MISO signal transmitted on MISO 114. Waveform 156 represents the data transmitted from SPI Client 104 to SPI Host 102. Waveform 156 represents the timing of the waveform as it is received at SPI Host 102. Waveform 156 is an example of data transmitted without utilizing delay compensation according to the examples herein. In the example of waveform 156, the overall loop delay 106 is ½ clock cycle. Therefore, as shown, the data in waveform 156 arrives at SPI Host 102 ½ clock cycle after the data is expected. The data in waveform 156 changes state at times $t_2$, $t_4$, $t_6$, and $t_8$. These times coincide with the rising edge of waveform 152 (SCLK 110). Data is sampled at the rising edge of waveform 152 in this example. Without delay compensation, waveform 156 changes state at the times when the data is sampled, which can lead to data errors.

Waveform 158 is an example of a MISO signal transmitted on MISO 114 with delay compensation performed at SPI Client 104 as described above. Waveform 158 represents the timing of the waveform as it is received at SPI Host 102. With delay compensation, the data in waveform 158 arrives at SPI Host 102 at the appropriate time so that the data can be sampled on the rising edge of waveform 152 (e.g., at times $t_2$, $t_4$, $t_6$, and $t_8$). At those times, waveform 158 is not changing state, which reduces the chance of data errors.

Figure 2A:
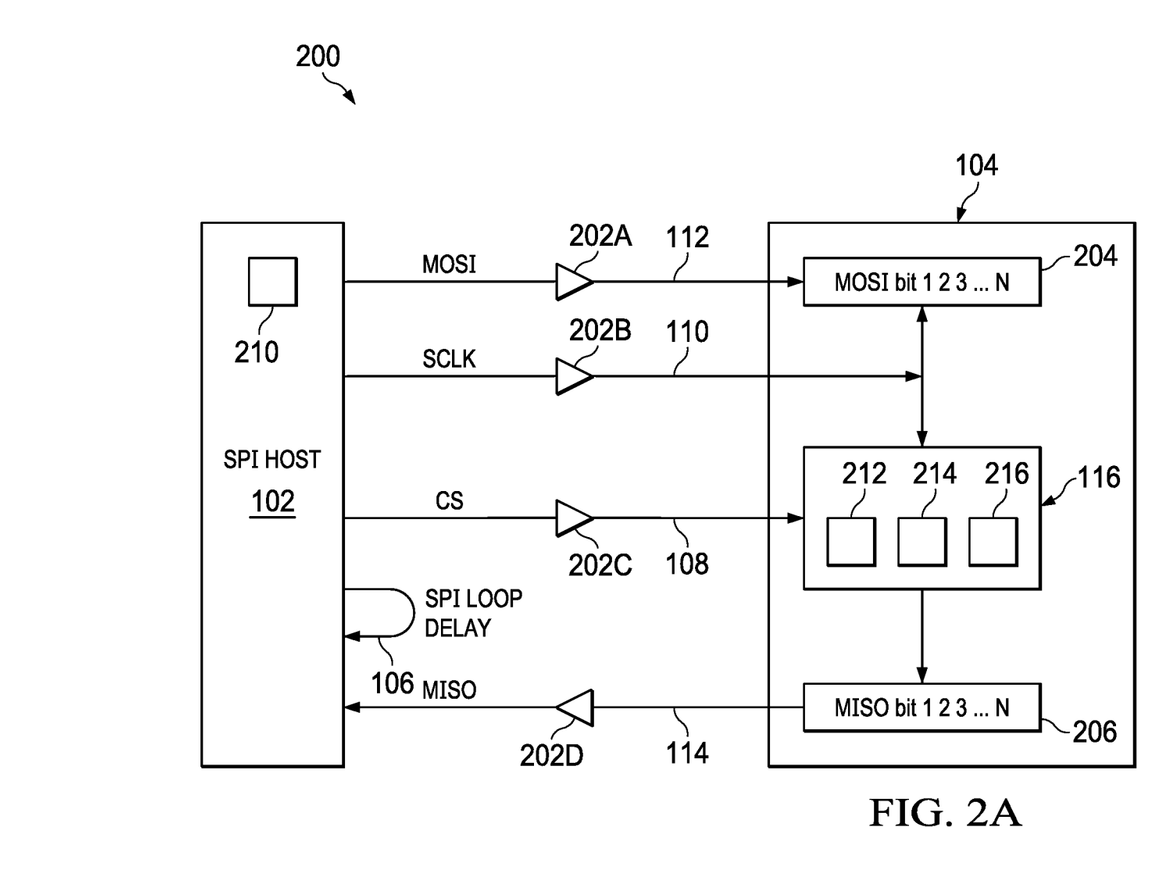
FIG. 2A is a block diagram of an SPI system in accordance with various examples.

FIG. 2A is an SPI system 200 according to various examples herein. In FIGS. 1A and 2A, like numerals represent like components. SPI Host 102 couples to SPI Client 104 via the SPI channel. The data line MOSI 112 has a delay 202A between SPI Host 102 and SPI Client 104. The data line SCLK 110 has a delay 202B between SPI Host 102 and SPI Client 104. The data line CS 108 has a delay 202C between SPI Host 102 and SPI Client 104. The data line MISO 114 has a delay 202D between SPI Client 104 and SPI Host 102. SPI loop delay 106 is the total propagation delay on the SPI channel.

Shift register 204 is a register in SPI Client 104 that stores data from SPI Host 102 transmitted on MOSI 112. In this example, a transmission of N bits is transmitted on MOSI 112. Shift register 206 is a register in SPI Client 104 that stores N bits of data to be transmitted from SPI Client 104 to SPI Host 102 on MISO 114.

An example operation is performed by SPI Host 102 and SPI Client 104. In this example, sub-modules 210, 212, 214, and 216 perform the operation. Sub-modules 210, 212, 214, and 216 can include any appropriate hardware and/or software to perform the operation. Sub-modules 210, 212, 214, and 216 can use existing hardware and/or software in an existing SPI Host 102 or SPI Client 104, or specially designed hardware and/or software may be implemented to perform the example operation. The example operation begins at SPI Host 102, where a sub-module 210 sets CS 108 low at least one SPI clock cycle before SPI Host 102 starts an SPI transfer. Setting CS 108 low operates to select an SPI Client 104 for SPI Host 102 to begin communicating with. At SPI Client 104, sub-module 212 receives the low signal on CS 108. SPI Client 104 is configured to transmit the first bit of data to SPI Host 102 at the falling edge of CS 108. SPI Client 104 transmits the first bit of data, and subsequent bits, on MISO 114.

After the first bit of data is transmitted from SPI Client 104 to SPI Host 102 on the falling edge of CS 108, subsequent bits are transmitted on the falling edges of SCLK 110, when the falling edges of SCLK 110 are received at SPI Client 104. Sub-module 212 receives SCLK 110 at SPI Client 104 and transmits the bits on the falling edges of SCLK 110. As an example, the second bit is transmitted on the first falling edge of SCLK 110, the third bit is transmitted on the second falling edge of SCLK 110, and so on. The falling edge of SCLK 110 is used in this example, but the rising edge may be used in other examples.

If the MISO 114 data propagation delay is less than one SPI clock cycle, sub-module 214 at SPI Client 104 device adds a corresponding delay X to SCLK 110, before it transmits the data on MISO 114, so that the resulting delay at SPI Host 102 will be approximately equivalent to one SPI clock cycle. Sub-module 214 performs this step so that data bits are received at SPI Host 102 at an appropriate time when SPI Host 102 is expecting to receive the data (e.g., not too early and not too late, based on the clock cycle). SCLK 110 is generated at SPI Host 102, and SPI Host 102 operates in timing with SCLK 110. The compensation for loop delay 106 is performed at SPI Client 104 in this example.

Adding a corresponding delay X before SPI Client 104 transmits data can be performed using any suitable hardware and/or software. As an example, if loop delay 106 is 0.7 SPI clock cycles, then the delay X added by sub-module 214 should be 0.3 SPI clock cycles (X=(SPI clock cycle)−(SPI loop delay)). With a loop delay 106 of 0.7 SPI clock cycles, and an additional delay X of 0.3 SPI clock cycles added by sub-module 214, the total delay at SPI Host 102 is 1.0 SPI clock cycles. An overall delay of 1.0 SPI clock cycles ensures that the data transmitted from SPI Client 104 arrives at SPI Host 102 at the appropriate time for sampling. In an example, the first bit of data from SPI Client 104 transmitted on the falling edge of CS 108 arrives at SPI Host 102 approximately one SPI clock cycle after SPI Host 102 sets CS 108 low. Because CS 108 is set low at least one SPI clock cycle before SPI Host 102 begins the SPI transfer, the data bit transferred from SPI Client 104 is received at SPI Host 102 before SCLK 110 switches state and samples the data bit. Therefore, sampling the data bits at SPI Host 102 does not occur when SCLK 110 switches state, but occurs when SCLK 110 is not switching state, which reduces the chance of data errors.

In another example, if the loop delay 106 is 0.5 SPI clock cycles, the corresponding delay X will be 0.5 SPI clock cycles, so that the total delay is again 1.0 clock cycles. Any appropriate hardware or software mechanism may be useful for creating a corresponding delay X. The delay can be created by delaying the clock signal SCLK 110. In another example, the delay can be created by delaying the data on MISO 114. The delay can be added externally to SPI Client 104 by using a delay buffer, an RC filter, or any other suitable hardware. A configurable RC filter or a configurable ring oscillator may be used in some examples to create the delay. An example of hardware that produces a corresponding delay X is described below.

At SPI Client 104, after each of the data bits of the SPI transmission have been transferred from SPI Client 104, the last clock cycle from SCLK 110 is blanked so that the number of bits transferred is N instead of N+1, where N is the size of the SPI transfer. Sub-module 216 can blank the last clock cycle using any appropriate hardware and/or software. An example of hardware that blanks the last clock cycle is described below.

In an example, N is eight, which means that the SPI transmission is eight data bits. Therefore, SPI Host 102 sends eight clock cycles on SCLK 110 to SPI Client 104. SPI Client sends the first bit of the eight bits to SPI Host 102 when CS 108 goes low, and then sends the last seven bits of the 8-bit transmission on the first seven clock cycles on SCLK 110. However, SPI Host 102 has sent eight clock cycles on SCLK 110 to SPI Client 104. Therefore, the eighth clock cycle will be received at SPI Client 104 after SPI Client 104 has transmitted all eight bits of the SPI transmission. If SPI Client 104 sends out a data bit on the eighth SCLK clock cycle as well, SPI Client 104 will send nine data bits instead of eight. Therefore, the eighth clock cycle on SCLK 110 should be "blanked" so that SPI Client 104 only sends eight data bits instead of nine, where eight data bits is the size of the SPI transmission in this example.

Figure 2B:
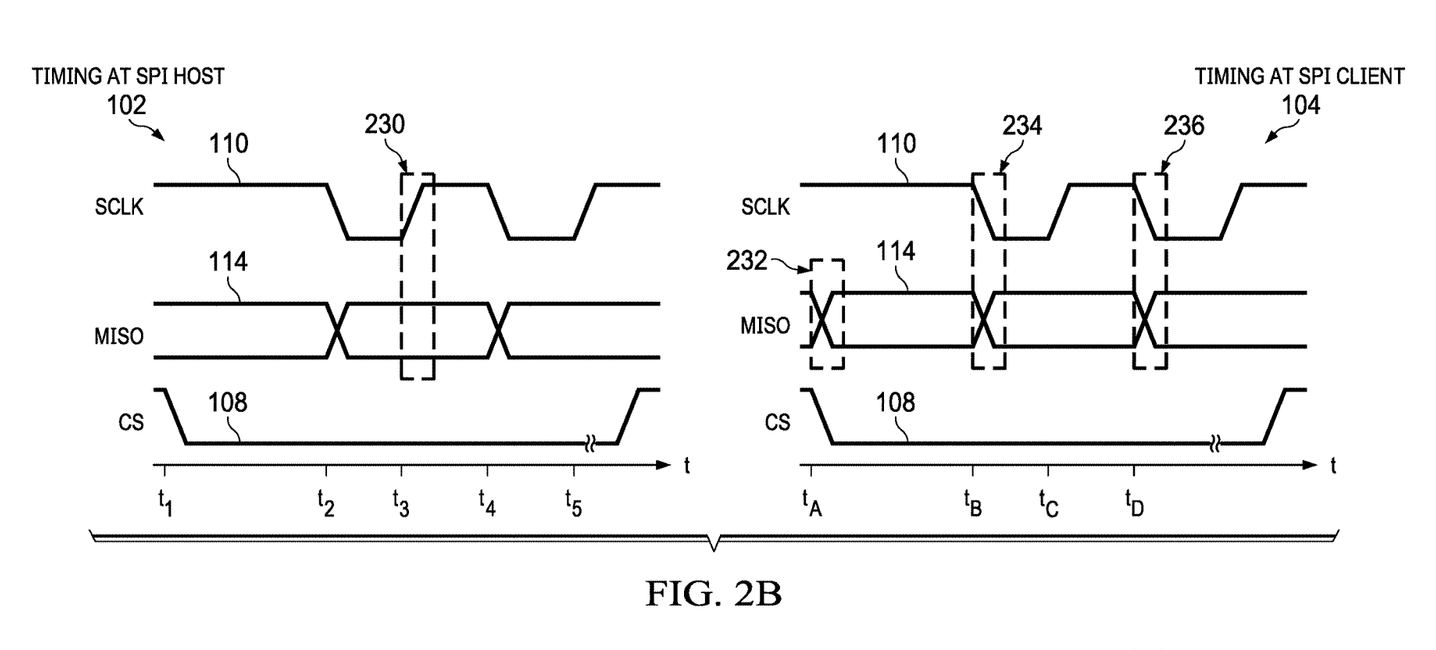
FIG. 2B is a timing diagram of waveforms in an SPI system in accordance with various examples.

FIG. 2B is a diagram of waveforms in an SPI system in accordance with various examples. On the left side of FIG. 2B are waveforms at SPI Host 102. On the right side of FIG. 2B are waveforms at SPI Client 104. At SPI Host 102, CS 108 is asserted low at time $t_1$. CS 108 is asserted low at least one clock cycle before SPI Host 102 transmits SCLK 110 to SPI Client 104, which begins the SPI transmission.

The timing at SPI Client 104 is shown on the right side of FIG. 2B. At SPI Client 104, a falling edge of CS 108 occurs at time $t_A$. Time $t_A$ occurs after time $t_1$ on SPI Host 102. The length of time that time $t_A$ occurs after time $t_1$ depends on the loop propagation delay. At time $t_A$ at SPI Client 104, SPI Client 104 transmits the first bit of the SPI transmission on MISO 114. Block 232 represents the transmission of the first bit at time $t_A$. SPI Client 104 uses any appropriate hardware and/or software to transmit the first bit of the SPI transmission on the falling edge of CS 108, as described above with sub-module 212.

At time $t_B$ at SPI Client 104, a falling edge of SCLK 110 is received. At this first falling edge, a second bit is transmitted on MISO 114 to SPI Host 102. Block 234 represents the transmission of the second bit of the SPI transmission on MISO 114. Time $t_B$ occurs after time $t_2$ at SPI Host 102. At time $t_C$, a rising edge of SCLK 110 is received at SPI Client 104. At time $t_D$, a falling edge of SCLK 110 is received at SPI Client 104. At this falling edge, SPI Client 104 transmits the third bit of the SPI transmission on MISO 114. Block 236 represents the transmission of the third bit. After the last data bit is sampled, CS 108 is again asserted high, which concludes the communication between SPI Host 102 and SPI Client 104. While FIG. 2B does not illustrate the blanking of the last clock cycle of SCLK 110, other examples described in FIGS. 3 and 4 below, perform blanking on SCLK 110.

The timing at SPI Host 102 is shown on the left side of FIG. 2B. At time $t_2$ at SPI Host 102, a falling edge of SCLK 110 is transmitted. SCLK 110 alternates falling and rising edges as shown. Time $t_2$ is at least one SPI clock cycle after time $t_1$. Also, at approximately time $t_2$, SPI Host 102 receives the first data bit on MISO 114 from SPI Client 104. As described above, SPI Client 104 transmitted the first data bit on MISO 114 after receiving the falling edge of CS 108.

At time $t_3$, a rising edge of SCLK 110 occurs at SPI Host 102. Data is sampled on the rising edge of SCLK 110 in this example. At time $t_3$, SPI Host 102 samples the first bit of data from SPI Client 104 on MISO 114. Block 230 represents the sampling of MISO 114 at time $t_3$. At time $t_4$, a falling edge of SCLK 110 occurs and the second bit of data from SPI Client 104 is received on MISO 114. At time $t_5$, a rising edge of SCLK 110 occurs and SPI Host 102 samples the second bit of data from SPI Client 104 on MISO 114. The process continues until all N data bits from the SPI transmission have been sent to SPI Host 102 and sampled. After the last data bit is sampled, CS 108 is again asserted high, which concludes the communication between SPI Host 102 and SPI Client 104.

As shown in FIG. 2B, the first data bit of the SPI transmission is sampled on the first rising edge of SCLK 110 at SPI Host 102, despite the SPI channel having a loop propagation delay. Sub-modules 212, 214, and 216 as described above perform the steps at SPI Client 104. Subsequent bits are also sampled at the rising edge of SCLK 110. The last clock cycle may be blanked so that the appropriate number of bits are transmitted to SPI Host 102.

Figure 3:
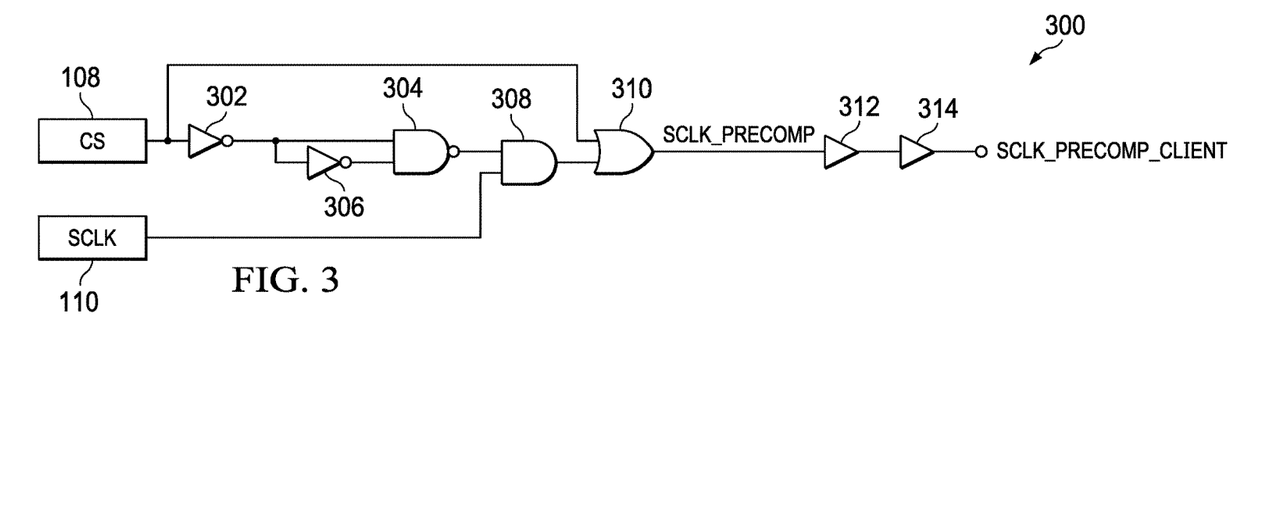
FIG. 3 is a logic circuit for providing clock signals in accordance with various examples.

FIG. 3 is a logic circuit 300 for providing the clock signals in accordance with various examples herein. Any suitable circuit, or any suitable software, may be used in other examples to provide the appropriate CS and SCLK signals used in examples herein.

Circuit 300 includes CS 108 and SCLK 110 as inputs. CS 108 is inverted with inverter 302 so that the falling edge of CS 108 at SPI Host 102 is inverted to a rising edge at the output of inverter 302. The output of inverter 302 is coupled to a first input of NAND gate 304. The output of inverter 302 is also coupled to inverter 306. The output of inverter 306 is coupled to the second input of NAND gate 304. The output of NAND gate 304 is a single clock pulse with a 50% duty cycle (50% high and 50% low).

The output of NAND gate 304 is coupled to a first input of AND gate 308. SCLK 110 is coupled to the second input of AND gate 308. AND gate 308 provides a signal to a first input of OR gate 310. CS 108 is coupled to the second input of OR gate 310. OR gate 310 provides the clock signal used by SPI Client 104. The output of OR gate 310 is called SCLK_PRECOMP. SCLK_PRECOMP is a pre-compensated clock signal that is similar to the SCLK 110 signal but has an additional clock cycle at the beginning (before the first clock cycle of SCLK 110), where the additional clock cycle is created with CS 108.

When CS 108 is low, the output of AND gate 308 is passed by OR gate 310. That is, when CS 108 is low, the output of OR gate 310 is high when SCLK 110 is high, and the output is low when SCLK 110 is low. When CS 108 goes high, the output of OR gate 310 is high. If CS 108 is held high, the output of OR gate 310 is always high, which acts to blank the last clock cycle (e.g., hold SCLK_PRECOMP high) after N clock cycles. That is, asserting CS 108 high operates to blank the last clock cycle at the appropriate time so that N clock cycles are provided instead of N+1 clock cycles.

Buffers 312 and 314 provide a delay of 50 nanoseconds in this example, to simulate an example loop delay 106 of 50 nanoseconds, which is done to create the example waveforms in FIG. 4 below. After the delay is added by buffers 312 and 314, the signal output at buffer 314 is SCLK_PRECOMP_CLIENT, which is the delayed pre-compensated clock signal at SPI Client 104. This signal is used by SPI Client 104 to transmit the SPI transmission to SPI Host 102.

Figure 4:
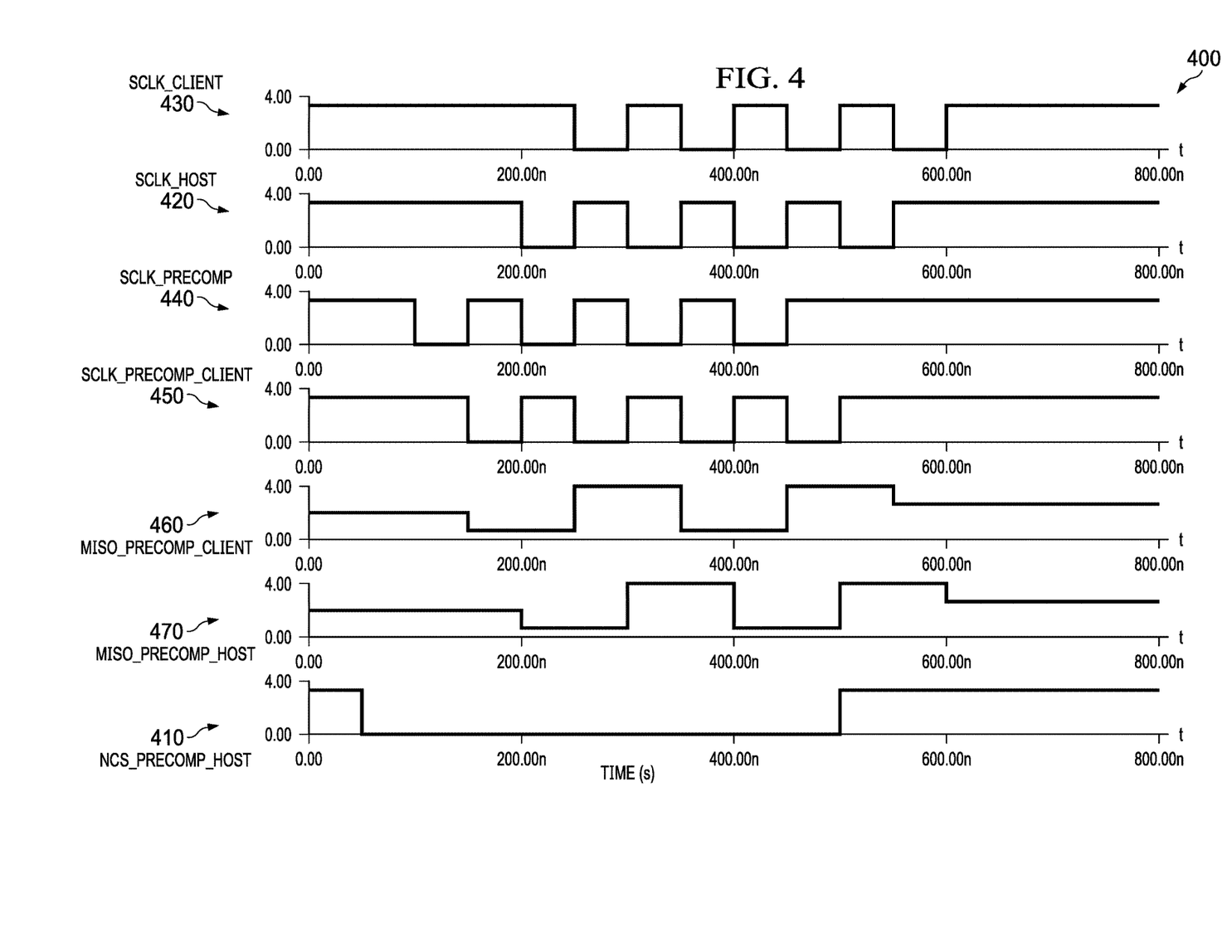
FIG. 4 is a collection of waveforms in accordance with various examples.

FIG. 4 is a collection of waveforms 400 in accordance with various examples. In one example, waveforms 400 are the waveforms generated in FIGS. 2A and 3. The bottom of FIG. 4 shows the time tin nanoseconds. In this example, the SPI clock cycle is 100 nanoseconds. Also, in this example, the delay is 50 nanoseconds in each transmit and receive direction, hence the overall loop delay 106 is 100 nanoseconds.

Waveform 410 is CS 108 at SPI Host 102 in one example (NCS_PRECOMP_HOST). Waveform 410 begins high, but is asserted low at approximately 50 nanoseconds. As described above, waveform 410 is used by SPI Client 104 to transmit the first data bit of the SPI transmission when it is received at SPI Client 104.

Waveform 420 is the SPI clock signal at SPI Host 102 (SCLK_HOST). Waveform 420 has a first falling edge at approximately 200 nanoseconds, which is at least one clock cycle after waveform 410 goes low (in this example, approximately 1.5 clock cycles). Waveform 420 is transmitted from SPI Host 102 to SPI Client 104 on SCLK 110. In this example, four clock cycles are shown, and an SPI transmission of four bits (N=4) is used as an example. Waveform 420 therefore has four falling edges and four rising edges.

Waveform 430 is the SPI clock signal at SPI Client 104 (SCLK_CLIENT). As seen in FIG. 4, waveform 430 is delayed behind waveform 420. The delay in this example is approximately 50 nanoseconds, which is the half of the value of the loop delay 106, since in that example the delay in transmit and receive direction is 50 nanoseconds for both. That is, the SPI channel has a delay of approximately 50 nanoseconds for signals to travel from SPI Host 102 to SPI Client 104. As an example, the first falling edge of waveform 420 occurs at 200 nanoseconds, while the first falling edge of waveform 430 occurs at 250 nanoseconds. Waveform 430 is identical to waveform 420 but delayed by 50 nanoseconds.

Waveform 440 is the SCLK_PRECOMP signal at SPI Host 102 as produced by circuit 300 in FIG. 3. The SCLK_PRECOMP signal has the form of a clock waveform, with alternating high and low values spaced 50 nanoseconds apart. As described above, waveform 440 is similar to the SCLK_HOST signal (waveform 420) but has an additional clock cycle at the beginning (before the first clock cycle of SCLK_HOST), where the additional clock cycle is created with CS 108. As shown in FIG. 4, SCLK_PRECOMP (waveform 440) has a first falling edge at approximately 100 nanoseconds, which is a full clock cycle before the first falling edge of waveform 420 (SCLK_HOST), which has its first falling edge at 200 nanoseconds. Therefore, waveform 440 operates as a clock signal that can be useful for transmitting the first data bit of the SPI transmission from SPI Client 104 to SPI Host 102 before the first falling edge of waveform 430 (SCLK_CLIENT) reaches SPI Client 104. Waveform 440 has four falling edges and four rising edges.

Waveform 450 is the SCLK_PRECOMP_CLIENT signal at SPI Client 104, as simulated by circuit 300 in FIG. 3. Waveform 450 is similar to waveform 440 (SCLK_PRECOMP) but delayed by approximately 50 nanoseconds due to the delay from the host to the client. Waveform 450 is the signal that SPI Client 104 uses to transmit the SPI transmission from SPI Client 104 to SPI Host 102 on MISO 114. On the falling edges of waveform 450, SPI Client 104 transmits one data bit of the SPI transmission to SPI Host 102. The first bit will be transmitted at approximately 150 nanoseconds, with each subsequent bit transmitted in 100 nanosecond intervals after that.

Waveform 460 is the MISO_PRECOMP_CLIENT signal. Waveform 450 is the data SPI transmission from SPI Client 104 to SPI Host 102, transmitted on MISO 114. The first bit of the SPI transmission is transmitted on the falling edge of waveform 450, at approximately 150 nanoseconds. In this example, the first bit is low or logical zero. The second bit is transmitted at approximately 250 nanoseconds (high or logical one), the third bit is transmitted at approximately 350 nanoseconds (low or logical zero), and the fourth bit is transmitted at approximately 450 nanoseconds (high or logical one).

Waveform 470 is the MISO_PRECOMP_HOST signal, which is the SPI transmission from waveform 460 as it is received at SPI Host 102. Waveform 470 is delayed approximately 50 nanoseconds behind waveform 460 due to the 50-nanosecond delay between the client and the host. The first bit of the SPI transfer is received at SPI Host 102 at approximately 200 nanoseconds, with each subsequent bit received at 100 nanosecond intervals.

The SPI transmission represented by waveform 470 is sampled at SPI Host 102 by the rising edge of waveform 420 (SCLK_HOST). The first bit is sampled at approximately 250 nanoseconds, with each subsequent bit sampled at 100 nanosecond intervals. Waveform 470 is therefore received in synchronization with waveform 420, and the data in waveform 470 can be sampled appropriately by waveform 420 at SPI Host 102, even when a delay is present on the SPI channel.

At approximately 500 nanoseconds, waveform 410 (CS 108) is asserted high. As described above with respect to FIG. 3, when CS 108 is asserted high the clock signal (waveform 440) is blanked. When waveform 410 is high at approximately 500 nanoseconds, waveform 440 is also held high at that time. Asserting waveform 410 high at 500 nanoseconds ensures that only four clock cycles are transmitted on waveform 440. Therefore, only four clock cycles are received at SPI Client 104 (waveform 450), and only four data bits will be transmitted (waveform 460) pursuant to those four clock cycles.

In the example described above, SPI Host 102 asserts waveform 410 high at the appropriate time based on the expected length of the SPI transmission (e.g., four bits). In another example, a counter could be used to blank the clock signal after an appropriate number of clock cycles.

Figure 5:
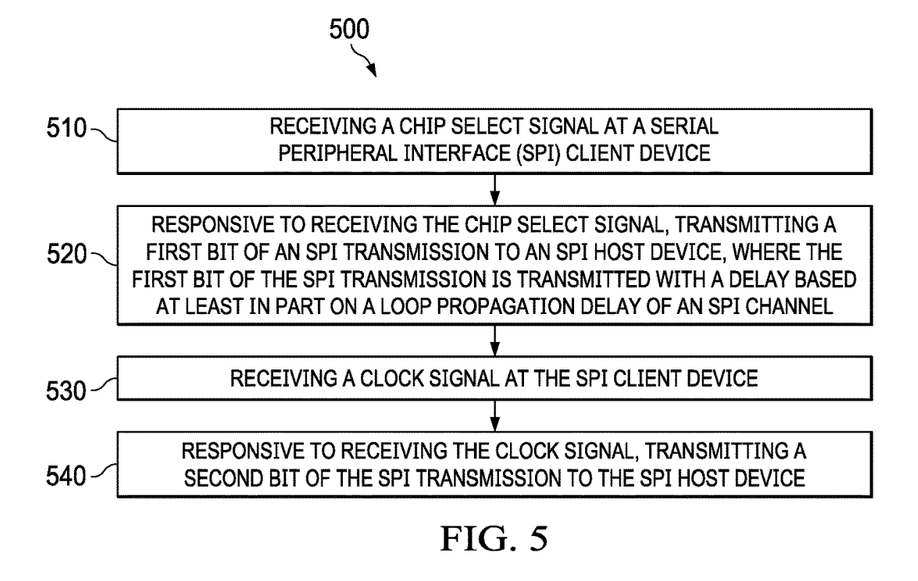
FIG. 5 is a flowchart of a method for propagation delay compensation in accordance with various examples.

FIG. 5 is a flowchart of an example method 500 for delay compensation in accordance with various examples. The steps of method 500 may be performed in any suitable order. The hardware and/or software that performs the steps of method 500 in one example is described in FIGS. 1A and 2A above. Any appropriate hardware and/or software may be used in other examples.

Method 500 begins at 510, where an SPI client device, such as SPI Client 104, receives a chip select signal. In examples herein, the chip select signal is used by the SPI client device to begin an SPI transmission.

At 520, responsive to receiving the chip select signal, an SPI client device transmits a first bit of an SPI transmission to an SPI host device, where the first bit of the SPI transmission is transmitted with a delay based at least in part on a loop propagation delay of an SPI channel. In an example, SPI Client 104 transmits the SPI transmission to SPI Host 102 over an SPI channel such as MISO 114. If a delay of a value X is needed in this example, sub-module 214 at SPI Client 104 could add the corresponding delay X to SCLK 110, before it transmits the data on MISO 114, so that the resulting delay at SPI Host 102 will be approximately equivalent to one SPI clock. In another example, the uncompensated loop delay may be approximately one SPI clock. In that case, a delay X as described above is not needed in that example (e.g., the delay X is zero).

At 530, the SPI client device receives a clock signal. As described above with respect to FIG. 4, the clock signal arrives at SPI Client 104 at least one clock cycle after the chip select signal.

At 540, responsive to receiving the clock signal, the SPI client device transmits a second bit of the SPI transmission to the SPI host device. Subsequent bits of the SPI transmission are transmitted to the SPI host device in response to receiving additional clock signals at the SPI client device.

In another method to compensate for loop delay at SPI Host 102, two clocks at SPI Host 102 may be used. A first clock is used to transmit data from SPI Host 102, and a second clock is used to receive data at SPI Host 102. The second clock is aligned with the timing of the received data, which considers the total loop propagation delay. The second clock can be aligned to the delay of the SPI system one time, and then allowed to operate. The second clock will operate correctly as long as the delay in the system does not change considerably. The second clock can be created in a number of ways, such as with an RC filter, a ring oscillator, or by using a higher frequency clock. The second clock signal may be aligned using any suitable alignment process.

This solution may also use tuning with bit registers so that the clock operates properly. This solution works with any length of delay, even delays longer than one clock cycle.

In another example solution, the data transmitted on MISO 114 can be used to align the clock with the data. This solution can be tuned at startup using a tuning operation, and then adjusted if the data path length changes, which results in a change in the path delay. One example method to tune the system is to send a test pattern from SPI Host 102 to SPI Client 104 and then back to SPI Host 102. The second clock is adjusted iteratively until the correct pattern is received at SPI Host 102. At that point, the system is tuned and ready for operation. The delay can be changed until errors are received at SPI Host 102. When errors are received, the delay has reached one-half of an SPI clock cycle. Then, a controller can adjust the second clock automatically, and the system designer does not have to perform those steps. Instead, the delay can be determined and adjusted automatically. This variation is valid for any of the above examples to automatically adjust the added delay X, so that the overall loop delay is a multiple integer N of the SPI clock cycle. N is equal to 1 in some of the examples above, but N can be any integer value in other examples.

Figure 6:
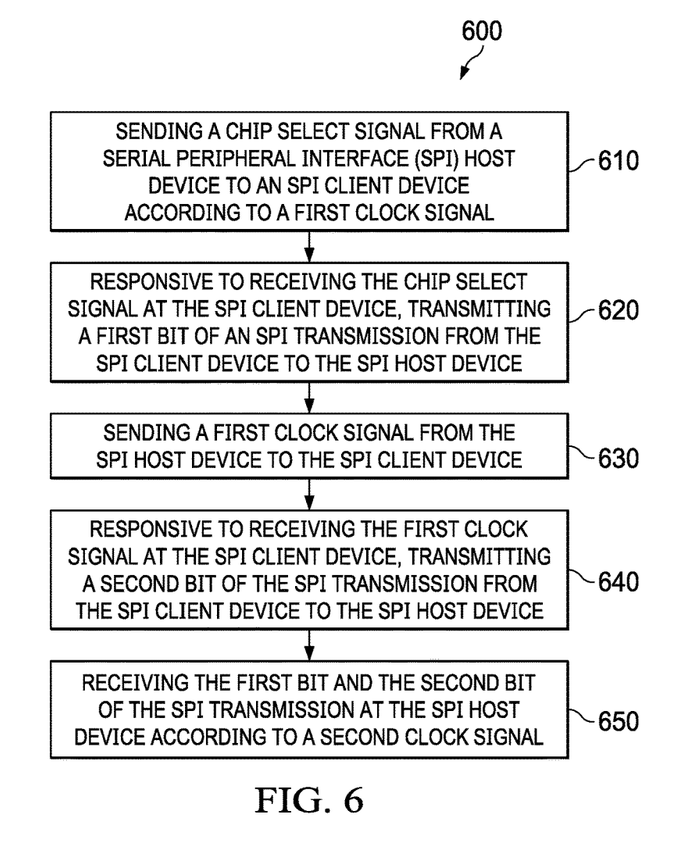
FIG. 6 is a flowchart of a method for propagation delay compensation in accordance with various examples.

FIG. 6 is a flowchart of an example method 600 for delay compensation in accordance with various examples. The steps of method 600 may be performed in any suitable order. The hardware and/or software that performs the steps of method 600 in one example is described in FIGS. 1A and 2A above. Any appropriate hardware and/or software may be used in other examples.

Method 600 begins at 610, where an SPI host device sends a chip select signal to an SPI client device according to a first clock signal. In an example, SPI Host 102 sends the chip select signal to SPI Client 104 as described above.

Method 600 continues at 620, where, responsive to receiving the chip select signal at the SPI client device, the SPI client device transmits a first bit of an SPI transmission from the SPI client device to the SPI host device. The transmission of the first bit can be delayed as described above with respect to FIG. 2A, so that the total delay is approximately equal to one clock cycle. Any suitable mechanism can be useful for adding the delay. In one example, sub-module 214 at SPI Client 104 adds a corresponding delay X to SCLK 110, before it transmits the data on MISO 114, so that the resulting delay at SPI Host 102 will be approximately equivalent to one SPI clock.

Method 600 continues at 630, where the SPI host device sends the first clock signal to the SPI client device. The first clock signal can be sent as described above with respect to FIGS. 3 and 4. The rising edge or the falling edge of the first clock signal could be used in various examples.

Method 600 continues at 640, where responsive to receiving the first clock signal at the SPI client device, the SPI client device transmits a second bit of the SPI transmission to the SPI host device. Subsequent bits of the SPI transmission are transmitted to the SPI host device in response to receiving additional clock signals of the first clock signal at the SPI client device.

Method 600 continues at step 650, where the SPI host device receives the first bit and the second bit of the SPI transmission according to a second clock signal. As described above, a first clock signal is used to transmit data from SPI Host 102, and a second clock signal is used to receive data at SPI Host 102. The second clock signal is aligned with the timing of the received data, which considers the total loop propagation delay. The second clock signal can be adjusted to the delay of the SPI system one time, and then allowed to operate. This example solution works with any length of delay, even delays longer than one clock cycle.

The term "couple" is used throughout the specification. The term may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

Circuits described herein are reconfigurable to include the replaced components to provide functionality at least partially similar to functionality available prior to the component replacement.

Unless otherwise stated, "about," "approximately," or "substantially" preceding a value means+/−10 percent of the stated value. Modifications are possible in the described examples, and other examples are possible within the scope of the claims.

What is claimed is:

1. A method, comprising:
   receiving a chip select signal at a serial peripheral interface (SPI) client device;
   responsive to receiving the chip select signal, transmitting a first bit of an SPI transmission to an SPI host device, wherein transmitting the first bit of the SPI transmission comprises transmitting the first bit with a delay based at least in part on a loop propagation delay of an SPI channel;
   receiving a clock signal at the SPI client device; and
   responsive to receiving the clock signal, transmitting a second bit of the SPI transmission to the SPI host device.

2. The method of claim 1, further comprising performing a tuning operation so that a sum of the delay and the loop propagation delay is a multiple integer N of a clock cycle of the clock signal.

3. The method of claim 1, wherein a combination of the delay and the loop propagation delay is approximately equal to one clock cycle of the clock signal.

4. The method of claim 1, wherein a delay buffer on the SPI channel creates the delay.

5. The method of claim 1, further comprising transmitting N bits of the SPI transmission to the SPI host device, where transmitting an Nth bit responsive to receiving an (N−1)th clock signal at the SPI client device.

6. The method of claim 5, wherein the SPI host device transmits N−1 clock signals to the SPI client device.

7. The method of claim 1, wherein the chip select signal is received at least one clock cycle before the clock signal is received.

8. A system, comprising:
a serial peripheral interface (SPI) client device comprising a first pin, a second pin, and a third pin, wherein the SPI client device is configured to:
receive a chip select signal at the first pin;
responsive to receiving the chip select signal, transmit a first bit of an SPI transmission via the second pin to an SPI host device;
receive a clock signal at the third pin; and
responsive to receiving the clock signal, transmit a second bit of the SPI transmission via the second pin to the SPI host device.

9. The system of claim 8, further comprising the SPI host device, wherein the SPI host device is configured to:
send the chip select signal to the SPI client device;
receive the first bit of the SPI transmission from the SPI client device;
send the clock signal to the SPI client device, the clock signal sent at least one clock cycle after the chip select signal; and
receive the second bit of the SPI transmission from the SPI client device.

10. The system of claim 8, wherein the SPI client device is further configured to transmit the first bit of the SPI transmission with a delay,
where the delay is based at least in part on a loop propagation delay of an SPI channel.

11. The system of claim 10, wherein a combination of the delay and the loop propagation delay is approximately equal to one clock cycle of the clock signal.

12. The system of claim 8, wherein the SPI client device is configured to transmit the first bit of the SPI transmission responsive to a transition in the chip select signal.

13. The system of claim 8, wherein the SPI client device is further configured to transmit N bits of the SPI transmission to the SPI host device,
where the SPI client device is configured to transmit an Nth bit responsive to receiving an (N−1)th clock signal at the SPI client device.

14. The system of claim 13, further comprising the SPI host device, wherein the SPI host device transmits N−1 clock signals to the SPI client device.

15. A method, comprising:
sending a chip select signal from a serial peripheral interface (SPI) host device to an SPI client device according to a first clock signal;
responsive to receiving the chip select signal at the SPI client device, transmitting a first bit of an SPI transmission from the SPI client device to the SPI host device;
sending the first clock signal from the SPI host device to the SPI client device;
responsive to receiving the first clock signal at the SPI client device, transmitting a second bit of the SPI transmission from the SPI client device to the SPI host device; and
receiving the first bit and the second bit of the SPI transmission at the SPI host device according to a second clock signal.

16. The method of claim 15, further comprising aligning, at the SPI host device, the second clock signal with data received at the SPI host device from the SPI client device.

17. The method of claim 16, further comprising adjusting, at the SPI host device, an alignment of the second clock signal based at least in part on a loop propagation delay of an SPI channel.

18. The method of claim 15, wherein the chip select signal is sent at least one clock cycle before the first clock signal is sent.

19. The method of claim 15, further comprising transmitting N bits of the SPI transmission to the SPI host device, where transmitting an Nth bit is responsive to receiving an (N−1)th clock signal of the first clock signal at the SPI client device.

20. The method of claim 15, wherein transmitting the first bit of the SPI transmission is responsive to a transition in the chip select signal.

* * * * *